United States Patent
Koumura et al.

(10) Patent No.: US 6,823,125 B2
(45) Date of Patent: Nov. 23, 2004

(54) OPTICAL FIBER BASE MATERIAL, ITS MANUFACTURING METHOD AND OPTICAL FIBER

(75) Inventors: Yukio Koumura, Tokyo (JP); Kazuto Hirabayashi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/100,911

(22) Filed: Mar. 20, 2002

(65) Prior Publication Data

US 2003/0063880 A1 Apr. 3, 2003

(30) Foreign Application Priority Data

Jun. 5, 2001 (JP) .................................... 2001-169290
Nov. 8, 2001 (JP) .................................... 2001-343455

(51) Int. Cl.[7] .............................................. G02B 6/02
(52) U.S. Cl. ...................................... 385/127; 385/123
(58) Field of Search .................................. 385/123, 127

(56) References Cited

U.S. PATENT DOCUMENTS 5,740,297 A * 4/1998 Onishi et al. ................ 385/127
6,535,679 B2 * 3/2003 Yokoyama et al. .......... 385/127

* cited by examiner

Primary Examiner—John D. Lee
Assistant Examiner—Eric Wong
(74) Attorney, Agent, or Firm—Oblon, Spivak, McClelland, Maier & Neustadt, P.C.

(57) ABSTRACT

A porous glass intermediate body constructed by a core original layer formed as a core portion of an optical fiber, and a first clad original layer formed as a first clad portion of the optical fiber is formed. Thereafter, a transparent glass intermediate body is made by consolidating the porous glass intermediate body within an atmospheric gas with a chlorine-based gas with no fluorine compound. Thereafter, a porous optical fiber base material is made by forming a second clad original layer as a second clad portion of the optical fiber on the circumferential surface of the transparent glass intermediate body. When a porous state is then maintained, the porous optical fiber base material is dehydrated within the atmospheric gas with a chlorine concentration higher than that during the consolidation of the porous glass intermediate body. Thereafter, an optical fiber base material is manufactured by consolidating the porous optical fiber base material within a similar atmospheric gas. The optical fiber is made by wire-drawing this optical fiber base material.

6 Claims, 5 Drawing Sheets

Fig.5c

OPTICAL FIBER BASE MATERIAL, ITS MANUFACTURING METHOD AND OPTICAL FIBER

FIELD OF THE INVENTION

The present invention relates to an optical fiber base material as the base of an optical fiber, its manufacturing method and the optical fiber.

BACKGROUND OF THE INVENTION

Figure 1A:
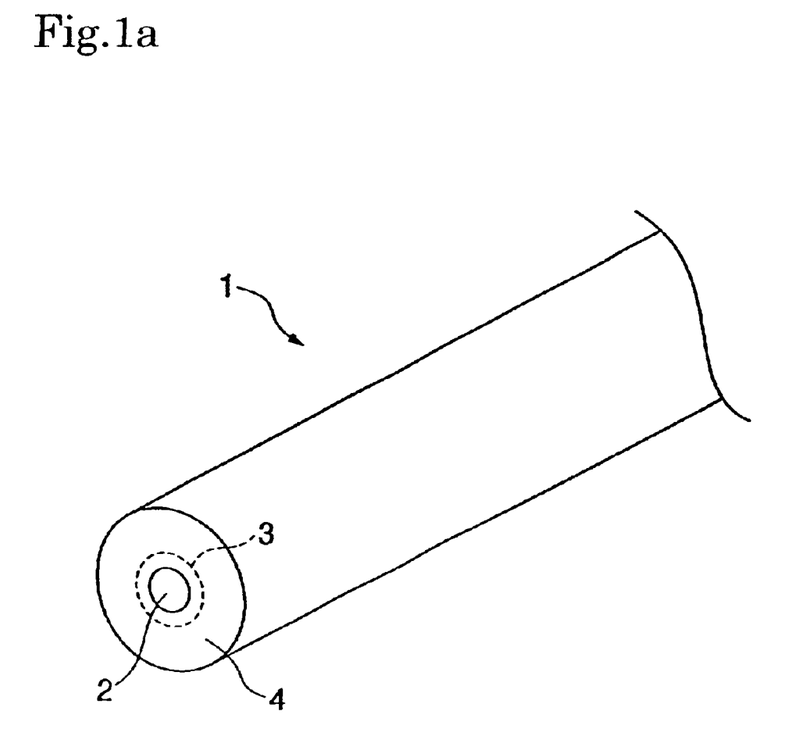
FIG. 1A is a view showing an example of an optical fiber of a depressed clad type structure.
Figure 1B:
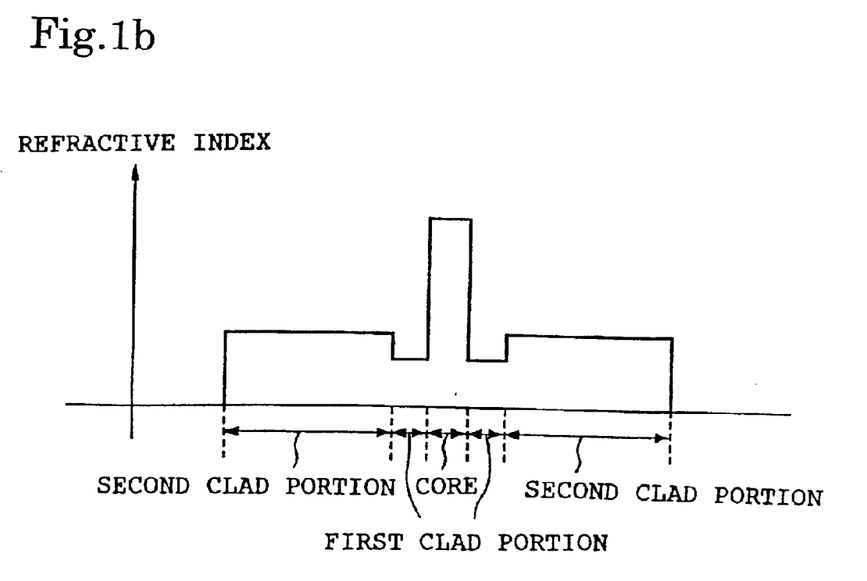
FIG. 1B is a graph showing an example of a refractive index distribution of this optical fiber.

In a single mode optical fiber, there is a so-called depressed clad type structure having a refractive index distribution as shown in FIG. 1B to improve chromatic dispersion characteristics. Namely, as shown in FIG. 1A, a first clad portion 3 is formed outside a core portion 2 in this single mode optical fiber 1. Further, a second clad portion 4 having a refractive index higher than that of the first clad portion 3 is formed outside this first clad portion 3.

SUMMARY OF THE INVENTION

The present invention in one aspect provides the following optical fiber base material. Namely, the optical fiber base material comprises:

a core original layer formed as a core portion of an optical fiber; and a first clad original layer and a second clad original layer sequentially laminated and formed on an outer circumferential face of the core original layer;

wherein chlorine is included in both the first and second clad original layers, and the second clad original layer includes chlorine of a concentration higher than that of the first clad original layer within a concentration range not less than 500 ppm and not more than 5000 ppm.

The invention in another aspect also provides the following optical fiber. This optical fiber comprises:

a core portion; and first and second clad portions sequentially laminated and formed on an outer circumferential face of the core portion;

wherein chlorine is included in both the first and second clad portions, and the second clad portion includes chlorine of a concentration higher than that of the first clad portion within a concentration range not less than 500 ppm and not more than 5000 ppm.

The invention in another aspect further provides the following manufacturing method of the optical fiber base material. This manufacturing method of the optical fiber base material comprises the steps of:

a process for forming a porous glass intermediate body constructed by depositing a porous first clad original layer on the circumferential surface of a porous core original layer;

a process for subsequently arranging and consolidating the porous glass intermediate body within an atmospheric gas including a chlorine-based gas with fluorine compound;

a process for making a porous optical fiber base material by forming a porous second clad original layer on the circumferential surface of a transparent glass intermediate body made by the consolidation process mentioned above;

a process for subsequently dehydrating the porous optical fiber base material at a set temperature for dehydration to maintain a porous state of the second clad original layer within the atmospheric gas having a chlorine concentration higher than that of the atmospheric gas at the time of consolidation of the porous glass intermediate body; and a process for making the optical fiber base material formed as transparent glass by consolidating the porous optical fiber base material within an atmospheric gas having a chlorine concentration higher than that of the atmospheric gas during the consolidation of the porous glass intermediate body.

BRIEF DESCRIPTION OF THE DRAWINGS

Embodiments of the invention will now be described in conjunction with drawings in which.

DETAILED DESCRIPTION

Figure 2A:
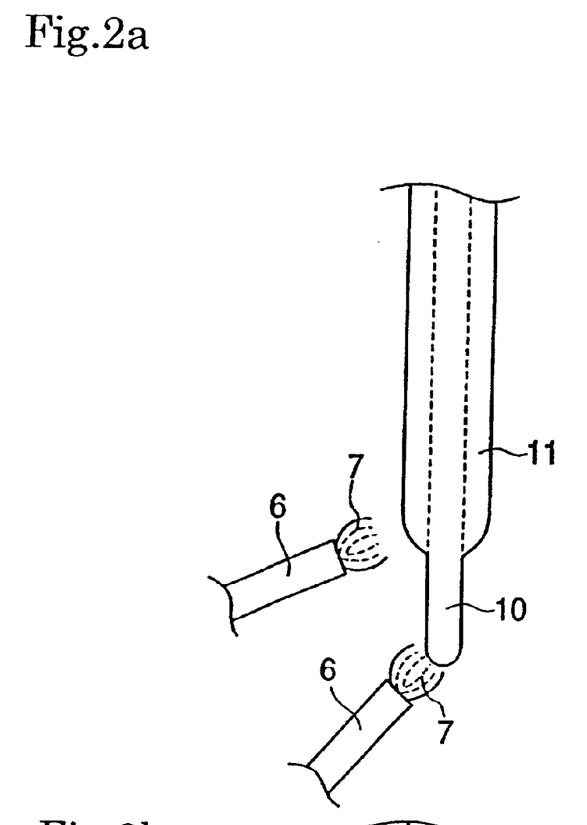
FIG. 2A is a view for explaining one example of a manufacturing process of an optical fiber base material (as a base of the optical fiber of FIG. 1A)
Figure 2B:
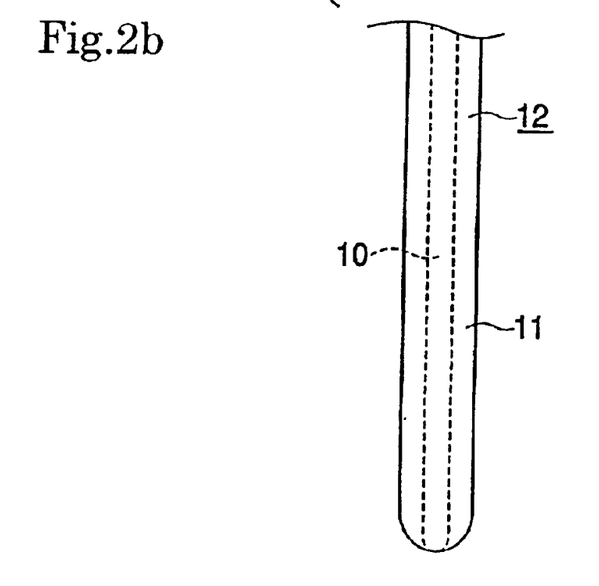
FIG. 2B is an illustration of an optical fiber from the manufacturing process used in FIG. 2A.

An optical fiber base material as the base of a single mode depressed clad type optical fiber 1 structure as shown in FIG. 1A can be manufactured as follows. For example, as shown in FIG. 2A, a glass raw material is first supplied to an oxyhydrogen flame 7 of a burner 6, and glass particulates are generated by a flame hydrolysis reaction. These glass particulates are deposited and grown in an unillustrated seed bar so that the core original layer 10 as a core portion 2 of the single mode optical fiber 1 is formed. Simultaneously, a first clad original layer 11 is formed outside the core original layer 10. This first clad original layer 11 is set as the first clad portion 3 of the single mode optical fiber 1. A bar-shaped porous glass intermediate body 12 constructed by the core original layer 10 and the first clad original layer 11 as shown in FIG. 2B is formed by this process.

Thereafter, this porous glass intermediate body 12 is dehydrated and consolidated and is set until solid and is formed as transparent glass. Here, this intermediate body formed as glass is called a transparent glass intermediate body.

Figure 3A:
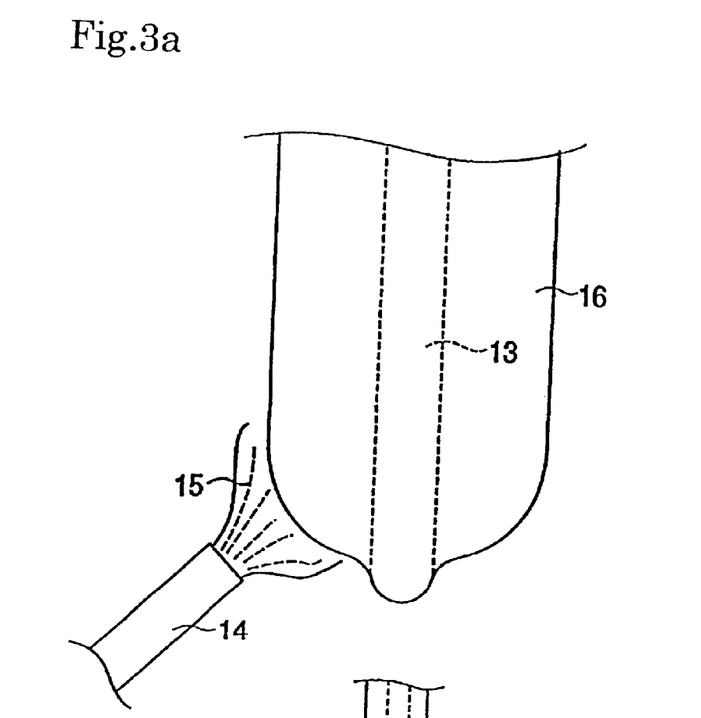
FIG. 3A is a view for furtherly explaining an example of a manufacturing process of an optical fiber.
Figure 3B:
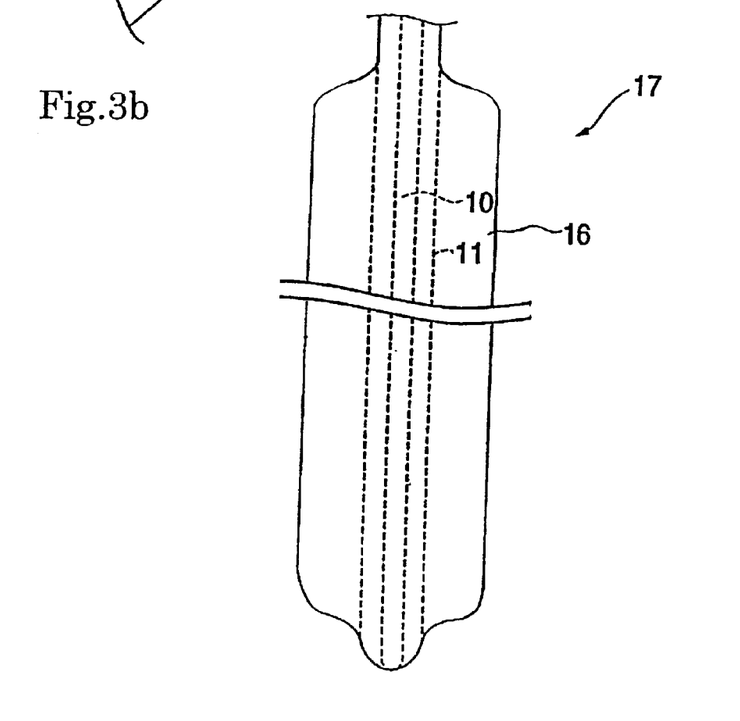
FIG. 3B shows one example of the optical fiber base material.

Thereafter, as shown in FIG. 3A, a second clad original layer 16 as a second clad portion 4 of the single mode optical fiber 1 is formed the outer circumferential surface of this transparent glass intermediate body 13. This second clad original layer 16 can be formed by generating glass particulates by supplying a glass raw material to an oxyhydrogen flame 15 of burner 14, and depositing these glass particulates on the outer surface of the transparent glass intermediate body 13. Thus, a porous optical fiber base material is made. An optical fiber base material 17 as shown in FIG. 3B can be manufactured by dehydrating, consolidating and forming this porous optical fiber base material into transparent glass. The single mode optical fiber 1 can be made by wire-drawing this optical fiber base material 17.

In the above manufacturing process of the optical fiber base material 17, when the transparent glass intermediate body 13 is made by dehydrating and consolidating the porous glass intermediate body 12, it is known that transmission loss of the optical fiber can be reduced and restrained when a chlorine-based gas is added in an atmospheric gas within a furnace used for dehydrating and consolidating the porous glass intermediate body 12. It is considered that this process was done because impurities within the core original layer 10 can be removed by chlorine.

However, when the chlorine-based gas is added in the atmospheric gas within the furnace, a portion of the chlorine entering the interior of the porous glass intermediate body 12 remains. There is a case in which the refractive index of the first clad original layer 11 in the transparent glass intermediate body 13 after the consolidation is increased by this residual chlorine, and becomes higher than the refractive index of the second clad original layer 16.

Therefore, a technique for inducing the chlorine-based gas in the atmospheric gas within the furnace is proposed to set the refractive index of the second clad original layer 16 to be higher than that of the first clad original layer 11 (for example, see U.S. Pat. No. 4,486,212, and Japanese Patent Laid-Open No. 115136/1991). A technique for mixing a fluorine compound such as $SiF_4$ into the atmospheric gas within the furnace in the consolidation of the porous glass intermediate body 12 is also proposed. Since the fluorine compound reduces the refractive index of the first clad original layer 11, it is possible to relatively raise the refractive index of the second clad original layer 16 in comparison with the refractive index of the first clad original layer 11.

In recent years, an outside diameter of the optical fiber base material 17 is increased and set to e.g., not less than 10 cm so as to raise productivity of the optical fiber. It is necessary to set the bulk density of the porous second clad original layer 16 formed outside the transparent glass intermediate body 13 to a high value such as about 0.3 to 0.9 ($g/cm^3$) so as to make a large sized optical fiber base material 17. This is because when the bulk density is low, the tendency for contraction is high that's why due to the cracks are easily caused during consolidation. In contrast to this, when the bulk density is high, the tendency for contraction is low and cracks are hardly caused during consolidation.

However, when the bulk density of the second clad original layer 16 is increased, the following problem is caused. When the porous optical fiber base material is dehydrated and consolidated, chlorine gas for performing the dehydration hardly enters the interior of the second clad original layer 16. Thus, second clad original layer 16 can not be sufficiently dehydrated. Therefore, the optical fiber base material having the second clad original layer 16 that was insufficiently dehydrated is manufactured. When the optical fiber is made from this optical fiber base material, the transmission loss of this optical fiber is increased.

Further, when the chlorine-based gas is included in the atmospheric gas within the furnace that is used for dehydrating and consolidating the porous optical fiber base material, it is intended that the refractive index of the second clad original layer 16 be raised in comparison with the first clad original layer 11 by leaving chlorine in the second clad original layer 16 as mentioned above. However, a problem is that chlorine hardly enters the interior of the second clad original layer 16 with a high bulk density, and it is difficult to raise the refractive index of the second clad original layer 16 in comparison with the first clad original layer 11.

Therefore, the refractive index of the first clad original layer 11 is reduced by consolidating the porous glass intermediate body 12 within the atmospheric gas mixed with the fluorine compound thereinto, and intentionally impregnating the interior of the first clad original layer 11 with fluorine so as to raise the refractive index of the second clad original layer 16 in comparison with the first clad original layer 11. However, in this case, the following problem is encountered. Namely, when the porous glass intermediate body 12 is consolidated, the amount of fluorine entering the porous glass intermediate body 12 is slightly changed by the bulk density of the porous glass intermediate body 12. As the mixing ratio of this fluorine is changed, the refractive index of the first clad original layer 11 is changed. Therefore, it becomes difficult to set, as designed, the difference in refractive index between the first clad original layer 11 and the second clad original layer 16, thus, a reduction in yield is caused.

This invention in one aspect provides an optical fiber having desirable transmission loss characteristics and desirable chromatic dispersion characteristics, and a large-sized optical fiber base material with a manufacturing method able to obtain this kind of optical fiber.

An embodiment of the invention will next be explained on the basis of the drawings.

The optical fiber of this embodiment is a single mode optical fiber of a depressed clad type structure as shown in FIG. 1A.

The present inventors variously changed a manufacturing process of the optical fiber base material as a base of the single mode optical fiber 1 to improve the chromatic dispersion characteristics and the transmission loss characteristics of such a single mode optical fiber 1. As a result, the following manufacturing process of the optical fiber base material has been found.

In the manufacturing process of the optical fiber base material of this embodiment, the large-sized optical fiber base material having an outside diameter not less than 10 cm is manufactured to improve productivity of the optical fiber. First, for example, as shown in FIG. 2A, a core original layer 10 and a first clad original layer 11 are simultaneously formed by utilizing a VAD (Vertical Axis Deposition) device similarly to the above case. The core original layer 10 is set as the core portion 2 of the single mode optical fiber 1. The first clad original layer 11 is set as the first clad portion 3 of the single mode optical fiber 1.

A bar-shaped porous glass intermediate body 12 is formed by this process as shown in FIG. 2B. In this process, dopants for raising the refractive index are included within glass particulates constituting the core original layer 10. For example, germanium (Ge) is used as one of the dopants.

Next, the dehydration process of this porous glass intermediate body 12 is performed. In this process, the porous glass intermediate body 12 is first arranged within an unillustrated furnace. While an atmospheric gas is flowed into this furnace, the porous glass intermediate body 12 is heated and dehydrated. With an atmospheric gas within this furnace, a chlorine-based gas is mixed with helium gas, and a mixing ratio of the chlorine-based gas is determined such that chlorine concentration is set to e.g., about 1 mol %. A heat treatment temperature is set at a temperature wherein porous state of the porous glass intermediate body 12 can be maintained and the dehydration is performed. For example, this temperature is set to about 1200° C.

Thereafter, the dehydrated porous glass intermediate body 12 is consolidated. In this embodiment, the temperature of the consolidation process is set to about 1600° C. For example, the temperature of the consolidation process is suitably determined in accordance with various elements such as a constituting material and a size of the porous glass intermediate body 12, and is not limited to about 1600° C.

The helium atmospheric gas including the chlorine-based gas with no fluorine compound is flowed into the furnace for consolidating the porous glass intermediate body 12.

With respect to the refractive index of the first clad portion 3 of the single mode optical fiber 1, an appropriate value for improving the chromatic dispersion characteristics and the transmission loss characteristics can be calculated in advance on the basis of various elements such as the refractive index of the core portion 2, the diameter of the core portion 2, and an outside diameter of the first clad portion 3. The refractive index of the first clad portion 3 is changed by the concentration of chlorine included in the first clad portion 3. Further, the chlorine concentration of this first clad portion 3 is changed by the chlorine concentration of the atmospheric gas during the consolidation of the porous glass intermediate body 12. Namely, the refractive index of the first clad portion 3 can be changed by the chlorine concentration of the atmospheric gas at the time of consolidation of the porous glass intermediate body 12.

Thus, the chlorine concentration of the atmospheric gas used during the consolidation of the porous glass intermediate body 12 is determined such that the refractive index of the first clad portion 3 becomes an appropriate refractive index able to improve the chromatic dispersion characteristics and the transmission loss characteristics. A range of the appropriate refractive index of the first clad portion 3 has been approximately determined, and it is obtained by an experiment that the chlorine concentration of the atmospheric gas at the time of consolidation of the porous glass intermediate body 12 is not more than 1 mol % on the basis of this range.

The porous glass intermediate body 12 is consolidated under the above condition of the consolidation processing temperature and the atmospheric gas. Thus, a transparent glass intermediate body 13 constructed as transparent glass is formed. Sizes, etc. of the core original layer 10 and the first clad original layer 11 of the transparent glass intermediate body 13 are different in accordance with specifications, etc. In one example, the diameter of the core original layer 10 is about 12 to 25 mm, and the outside diameter of the first clad original layer 11 is about 50 to 110 mm. The relative refractive index difference between the core portion 2 and the first clad portion 3 of the optical fiber based on this transparent glass intermediate body 13 is about 0.3 to 0.4%.

Thereafter, the transparent glass intermediate body 13 is extended with a constant diameter in accordance with the need. Thereafter, as shown in FIG. 3A, a porous second clad original layer 16 is formed outside the transparent glass intermediate body 13 so that a porous optical fiber base material is made. In this embodiment, a large-sized optical fiber base material is manufactured, and the porous second clad original layer 16 is formed with a high bulk density approximately ranging from 0.5 to 0.8 g/cm$^3$.

Next, this porous optical fiber base material is dehydrated. In this process, similar to the above dehydration process of the porous glass intermediate body 12, the porous optical fiber base material is dehydrated within the atmospheric gas of helium mixed with a chlorine-based gas. Here, the chlorine concentration of the atmospheric gas is set to be higher than that in the dehydration process of the porous glass intermediate body 12. Namely, in this dehydration process of the porous optical fiber base material, the chlorine concentration of the atmospheric gas is set to be higher than 1 mol %. In this dehydration process, the temperature of the dehydration process is set at a temperature for maintaining the porous state of the second clad original layer 16. The porous optical fiber base material is left as it is for about two hours within the furnace at this high temperature, and the dehydration process of the porous optical fiber base material is performed. Temperature of the dehydration process is not particularly limited if this temperature is a temperature at which the porous state of the second clad original layer 16 can be maintained and the dehydration process of the second clad original layer 16 is performed. For example, this temperature is set to about 1200° C.

Thereafter, the porous optical fiber base material after the dehydration process is consolidated at a consolidation processing temperature (e.g., about 1600° C.) within the atmospheric gas including the chlorine-based gas. At this time, the chlorine concentration of the atmospheric gas used during the consolidation of the porous optical fiber base material is set with a chlorine concentration higher than the chlorine concentration during the consolidation of the porous glass intermediate body 12, i.e., a chlorine concentration higher than 1 mol %. The interior of the second clad original layer 16 is impregnated with the chlorine of this atmospheric gas during this consolidation, and the refractive index of the second clad original layer 16 can be set to be higher than the refractive index of the first clad original layer 11.

The concentration of chlorine included in the second clad original layer 16 suitably lies within a range in which the difference between this concentration and the chlorine concentration of the first clad original layer 11 is not less than 100 ppm and is not more than 800 ppm in view of the manufacturing probelm. Further, The chlorine concentration of the atmospheric gas during the consolidation of the porous optical fiber base material is preferably set to be not more than 10 mol %. Namely, in this embodiment, the chlorine concentration of the atmospheric gas during the consolidation of the porous optical fiber base material is set to a concentration at which the second clad portion 4 can have an appropriate refractive index for providing desired chromatic dispersion characteristics within a range higher than 1 mol % and not more than 10 mol %.

The porous optical fiber base material is consolidated by this consolidation process so that an optical fiber base material 17 formed as glass as shown in FIG. 3B is made. For example, the single mode optical fiber 1 can be made by wire-drawing this optical fiber base material 17 at a speed of e.g., 1000 m/min.

The optical fiber base material 17 is made by the above manufacturing process. The single mode optical fiber 1 having preferable chromatic dispersion characteristics and preferable transmission loss characteristics can be obtained by manufacturing the single mode optical fiber 1 from this optical fiber base material 17. The concentration of chlorine included in the second clad portion 4 is measured with respect to the single mode optical fiber 1 having these desirable characteristics. It has been then found that the second clad portion 4, preferably, includes chlorine having a concentration higher than that of the first clad portion 3 in a concentration range not less than 500 ppm and not more than 5000 ppm. In view of the manufacturing problem, it has been also found that the difference in chlorine concentration between the first clad portion 3 and the second clad portion 4 is preferably restrained to a range of not less than 100 ppm and not more than 800 ppm.

Further, with respect to the optical fiber base material 17 as a base of such a single mode optical fiber 1, the chlorine concentration of the second clad original layer 16 (as the second clad portion 4) preferably includes chlorine having a concentration higher than that of the first clad original layer 11 (as the first clad portion 3), in a concentration range of not less than 500 ppm and not more than 5000 ppm. It has been also found that the difference in chlorine concentration between this second clad original layer 16 and the first clad original layer 11 is preferably restrained to a range of not less than 100 ppm and not more than 800 ppm.

The chromatic dispersion characteristics and the transmission loss characteristics of the single mode optical fiber 1 can be improved by manufacturing the optical fiber base material 17 by the manufacturing process described in this embodiment so as to provide the above chlorine concentration, and making the single mode optical fiber 1.

The present inventors have confirmed this effect by an experiment. In this experiment, many kinds of large-sized optical fiber base materials 17 were manufactured by changing the consolidating condition and the dehydrating condition of the porous glass intermediate body 12, and the consolidating condition of the porous optical fiber base material as shown in Table 1.

In the embodiment 2, the duration of the dehydration process of the porous optical fiber base material is set to four hours longer than the dehydration time of the embodiment 1. The others are similar to those in the embodiment 1.

The manufacturing process in each of comparison examples 1 to 3 is different from the one shown in this embodiment. In the comparison example 1, a dehydration process of the porous optical fiber base material is omitted. The others are similar to those in the embodiment 1. In the comparison example 2, each chlorine concentration of the atmospheric gas during the dehydration of the porous optical fiber base material and the atmospheric gas during consolidation is set to 1 mol % smaller than the chlorine concentration in the embodiment 1. The others are similar to those in the embodiment 1. In the comparison example 3, the atmospheric gas at the consolidation of the porous glass intermediate body 12 is a helium atmospheric gas of 0.5 mol % in concentration of fluorine compound ($SiF_4$) with no chlorine. The consolidation temperature is 1350° C. The others are similar to those in the embodiment 1.

The single mode optical fiber 1 was made from each optical fiber base material 17 made by each of the manufacturing processes of these embodiments 1, 2 and the comparison examples 1 to 3. The chlorine concentration of the core portion 2 and the first clad portion 3 (transparent glass intermediate body) and the chlorine concentration of the second clad portion 4 were measured with respect to each single mode optical fiber 1. Table 2 shows results of this measurement.

TABLE 1

| | Consolidating condition of porous glass intermediate body | | | Dehydrating condition of porous optical fiber base material | | | Consolidating condition of porous optical fiber base material | |
|---|---|---|---|---|---|---|---|---|
| | $SiF_4$/He flow ratio (mol %) | $Cl_2$/He flow ratio (mol %) | Temperature (° C.) | Dehydration processing time (hour) | Temperature (° C.) | $Cl_2$/He flow ratio (mol %) | Temperature (° C.) | $Cl_2$/He flow ratio (mol %) |
| Embodiment 1 | 0 | 0.5 | 1600 | 2 | 1200 | 3 | 1600 | 3 |
| Embodiment 2 | 0 | 0.5 | 1600 | 4 | 1200 | 3 | 1600 | 3 |
| Comparison example 1 | 0 | 0.5 | 1600 | 0 | nothing | nothing | 1600 | 3 |
| Comparison example 2 | 0 | 0.5 | 1600 | 2 | 1200 | 1 | 1600 | 1 |
| Comparison example 3 | 0.5 | 0 | 1350 | 2 | 1200 | 3 | 1600 | 3 |

Both embodiments 1 and 2 are set in accordance with the manufacturing process shown in this embodiment. In the embodiment 1, the atmospheric gas during the consolidation of the porous glass intermediate body 12 is set to a helium atmospheric gas having 0.5 mol % in chlorine concentration and including no fluorine compound ($SiF_4$). The consolidation processing temperature is set to 1600° C. The dehydration time of the porous optical fiber base material is set to two hours. The dehydration processing temperature is set to 1200° C. The atmospheric gas is set to a helium atmospheric gas of 3 mol % in chlorine concentration. Further, the atmospheric gas at the consolidation of the porous optical fiber base material is similarly the helium atmospheric gas with 3 mol % in chlorine concentration. The consolidation processing temperature is 1600° C.

TABLE 2

| | Chlorine concentration of transparent glass intermediate body (ppm) | Chlorine concentration of second clad portion (ppm) |
|---|---|---|
| Embodiment 1 | 600 | 800 |
| Embodiment 2 | 600 | 1200 |
| Comparison example 1 | 600 | 100 |
| Comparison example 2 | 600 | 300 |
| Comparison example 3 | 100 | 800 |

It can be seen from these results that the chlorine concentration of the second clad portion 4 of the single mode optical fiber 1 can be raised in comparison with the first clad portion 3, i.e; the refractive index of the second clad portion 4 of the single mode optical fiber 1 can be raised in comparison with the first clad portion 3 by setting the chlorine concentration of the atmospheric gas during the dehydration process and the consolidation of the porous optical fiber base material to be higher than the chlorine concentration of the atmospheric gas during the consolidation of the porous glass intermediate body 12.

Further, transmission loss at wavelengths of 1.31 μm and 1.55 μm was measured by changing the core diameter. As a result of this measurement, in the respective optical fibers relative to the embodiments 1, 2, the transmission loss was small and the core diameter was large in comparison with the optical fibers relative to the comparison examples 1, 2. The reasons for this are considered as follows. Namely, when the chlorine concentration of the second clad original layer 16 of the optical fiber base material 17 is high, hardness of the second clad original layer 16 is reduced in the wire drawing process of this optical fiber base material 17. Therefore, the distortions caused by the second clad original layer 16 on the core original layer 10 (core portion 2) is reduced at wire-drawing time. Thus, since the distortion of the core portion 2 of the optical fiber 1 caused by the hardness of the second clad original layer 16 can be reduced, it is considered that the transmission loss can be reduced and restrained.

Figure 4:
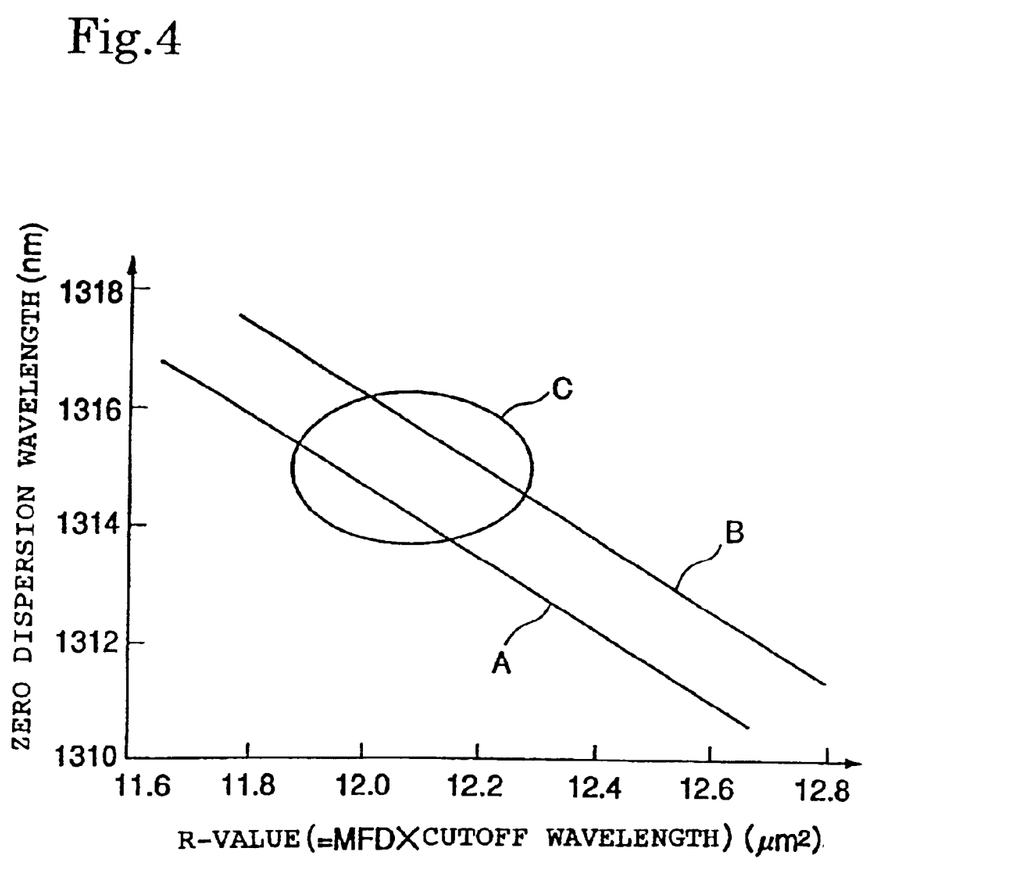
FIG. 4 is a graph which shows the chromatic dispersion characteristics of an optical fiber, made from the optical fiber base material that was created based on the manufacturing technique of one embodiment of the invention and is shown together with one example of the chromatic dispersion characteristics of another optical fiber made from the optical fiber base material by utilizing another manufacturing process.

Further, the relation of a zero dispersion wavelength and a value (written as an R-value) obtained by multiplying a cutoff wavelength by a mode field diameter (MFD) of the optical fiber was examined. The graph of FIG. 4 shows results of this examination. In this FIG. 4, a solid line A relates to the embodiments 1, 2. A solid line B relates to the comparison examples 1, 2. Data relative to the comparison example 3 are scattered within an area surrounded by a solid line C.

It can be seen that the value of the zero dispersion wavelength with respect to the R-value is preferably small, and zero dispersion wavelength characteristics in the embodiments 1, 2 (see the solid line A) are improved compared with the comparison examples 1, 2 (see the solid line B). Further, in the comparison example 3, the value of the zero dispersion wavelength is scattered. This was considered since impurities can not be sufficiently removed from the core original layer 10 since chlorine is included within the atmospheric gas when the porous glass intermediate body 12 is consolidated. Therefore, in the optical fiber of the comparison example 3, the transmission loss was large.

As mentioned above, it has been confirmed through experiment that the respective optical fibers relative to the embodiments 1, 2 and made in accordance with the manufacturing process shown in this embodiment are improved in both the chromatic dispersion characteristics and the transmission loss characteristics compared with the respective optical fibers relative to the comparison examples 1 to 3 and manufactured by means of another technique.

Figure 5A:
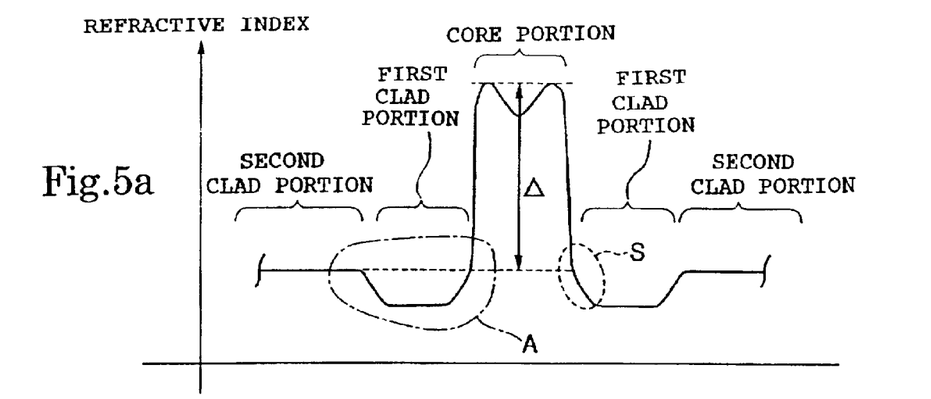
FIG. 5A is a graph showing a refractive index profile of an optical fiber made from the optical fiber base material of the invention.
Figure 5B:
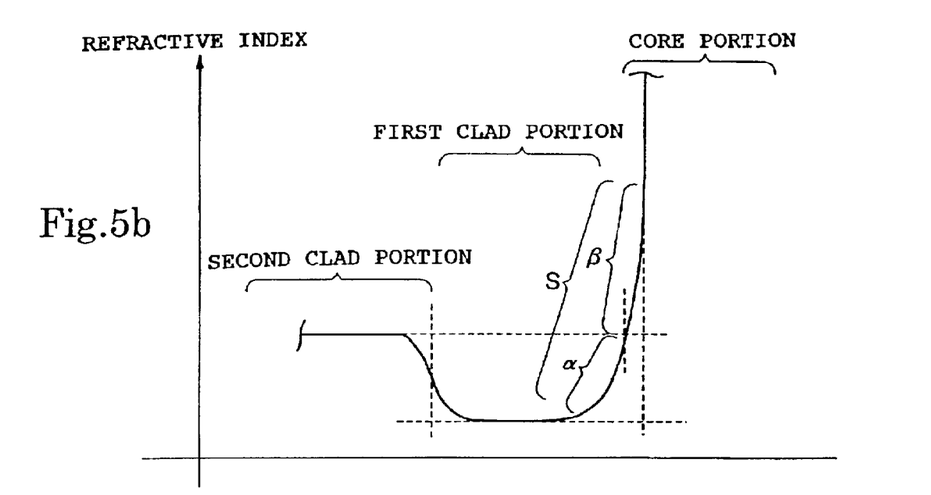
FIG. 5B is an enlarged refractive index profile of the first clad portion from graph 5A.
Figure 5C:
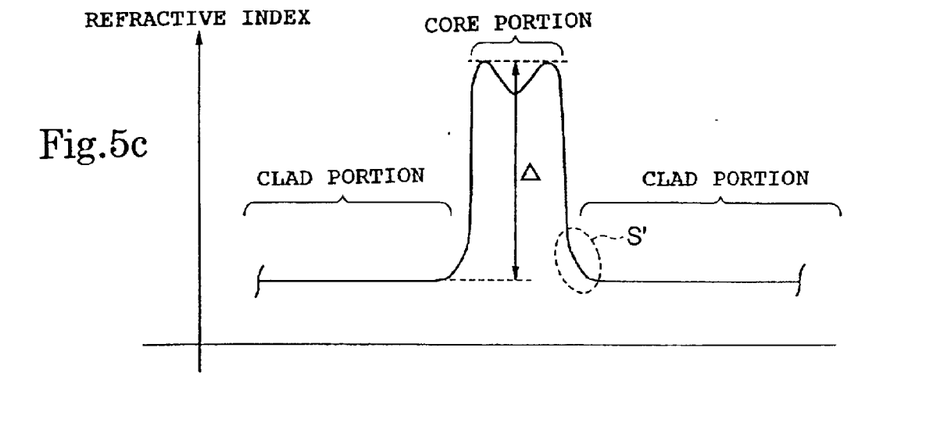
FIG. 5C is a graph showing an example of the refractive index profile of the optical fiber having no depressed clad type structure.

As in the optical fiber shown in this embodiment, the optical fiber of the depressed clad type having a refractive index profile as shown in FIG. 5A can improve the zero dispersion wavelength characteristics in comparison with the optical fiber having the refractive index profile as shown in FIG. 5C. The present inventors have shown why this result was obtained by making many experiments and fabrications.

Namely, in the refractive index profile (see FIG. 5A) of the optical fiber of the depressed clad type, the refractive index of the core portion is set to a refractive index raised in comparison with the refractive index of a glass body of silicon dioxide by including a dopant (e.g., germanium dioxide) in the glass body of silicon dioxide. The refractive index of the first clad portion is approximately set to the refractive index of the glass body of silicon dioxide. Further, the refractive index of the second clad portion is set to a refractive index raised in comparison with the first clad portion by including chlorine ions in the glass body of silicon dioxide.

FIG. 5B shows a refractive index profile in which a portion surrounded by a chain line A of FIG. 5A is enlarged. Since the dopant is generally diffused from an outer circumferential portion of the core portion into the first clad portion, curve S of the refractive index is situated in a boundary area of the core portion and the first clad portion as shown in FIG. 5B. This curve S is one of causes making the zero dispersion wavelength characteristics worse.

When Δ of each of FIGS. 5A and 5C is approximately equal, the tendency of the dopant to diffuse from the core portion to the first clad portion is approximately the same in the depressed clad type optical fiber having the refractive index profile as shown in FIG. 5A, and the optical fiber having the refractive index profile as shown in FIG. 5C. Thus, curve S of FIG. 5A and curve S' of FIG. 5C approximately have similar tendencies.

Therefore, it seems that each of these S, S' parts has a bad effect on the zero dispersion wavelength characteristics of the optical fiber in the same way. However, in the depressed clad type optical fiber, the curve of the refractive index of the core portion with respect to the second clad portion is mainly concerned in the zero dispersion wavelength characteristics. Since the refractive index of the first clad portion is reduced in comparison with the second clad portion in the depressed clad type optical fiber, the curve of the refractive index of the core portion with respect to the second clad portion apparently becomes only a β-portion of the curve shown in FIG. 5B. Namely, since the refractive index of the first clad portion is reduced in comparison with the second clad portion, a portion α of the curve S becomes lower than the refractive index of the second clad portion so that only the small portion β of the curve influences the zero dispersion wavelength characteristics.

Accordingly, in comparison with a case in which curve S' as shown in FIG. 5C causes a bad effect on the zero dispersion wavelength characteristics, the curve's influence on the zero dispersion wavelength characteristics is apparently greatly reduced and restrained only in the β-portion in the depressed clad type optical fiber so that the zero dispersion wavelength can be greatly reduced.

The purposes for such improvements of the zero dispersion wavelength characteristics in the depressed clad type optical fiber were not clear until now. However, these purposes have been clarified by the many efforts of the present inventors. In consideration of these newly clarified matters newly clarified, this invention has been made and the manufacturing process of the optical fiber base material as in the above embodiment has been found, and the following effects can be obtained.

In accordance with this embodiment, a process for dehydrating the porous optical fiber base material while maintaining the porous state of the porous optical fiber base material is arranged separately from the consolidating process in the manufacturing of the optical fiber base material 17. Therefore, the second clad original layer 16 can be sufficiently dehydrated since the dehydration process, condition can be determined without being restrained by the condition in the consolidating process even when the bulk density of the second clad original layer 16 of the optical fiber base material 17 is increased. Therefore, it is possible to prevent an increase in transmission loss of the optical fiber 1 which was caused by the insufficiency of the dehydration of the second clad original layer 16.

In this embodiment, the chlorine-based gas is also mixed into the atmospheric gas at the time of the dehydration process as well as the consolidation of the porous optical fiber base material. Thus, the exposure of the porous optical fiber base material to the chlorine-based gas is lengthened, and chlorine can sufficiently enter the interior of the second clad original layer 16 of the porous optical fiber base material. Furthermore, in this embodiment, the chlorine concentration of the atmospheric gas during the dehydration process and at the time of consolidation of the porous optical fiber base material is set to be higher than the chlorine concentration of the atmospheric gas during the consolidation of the porous glass intermediate body 12. Thus, the second clad portion 4 of the optical fiber 1 can have a refractive index higher that that of the first clad portion 3 by manufacturing the optical fiber 1 from the optical fiber base material 17 using the manufacturing process of this embodiment. The curve's influence of the refractive index of the core portion 2 with respect to the second clad portion 4 as mentioned above can be apparently reduced and restrained by the difference in refractive index between this first clad portion 3 and the second clad portion 4, and the chromatic dispersion characteristics of the optical fiber 1 can be improved.

Further, in the consolidation of the porous optical fiber base material, the chlorine concentration of the atmospheric gas is set to lie within a range higher than 1 mol % and not more than 10 mol %, and the concentration of chlorine mixed into the second clad original layer 16 of the optical fiber base material 17 is set to a high concentration of not less than 500 ppm. Therefore, when the optical fiber base material 17 is wire-drawn, the hardness of the second clad original layer 16 is reduced. Thus, the distortion caused by the second clad original layer 16 on the core original layer 10 (core portion 2) during wire-drawing time is reduced. As a result, the transmission loss of the optical fiber 1 can be reduced and restrained thus the transmission loss characteristics can be greatly improved.

Further, the optical fiber 1 can be easily manufactured from the optical fiber base material 17 by forming the second clad original layer 16 of the optical fiber base material 17; so as to provide a chlorine concentration within a range, in which the difference in chlorine concentration between the second clad original layer 16 and the first clad original layer 11, is not less than 100 ppm and is not more than 800 ppm.

This invention is not limited to this embodiment mode, but various embodiment modes can be adopted. For example, in this embodiment, the difference in chlorine concentration between the first clad portion 3 and the second clad portion 4 of the single mode optical fiber 1, and the difference in chlorine concentration between the first clad original layer 11 and the second clad original layer 16 of the optical fiber base material 17 are respectively set to a range not less than 100 ppm and not more than 800 ppm. However, for example, if the manufacturing problem is solved, these differences in chlorine concentration are not limited to this range.

What is claimed is:

1. An optical fiber base material comprising:
   a core original layer formed as a core portion of an optical fiber; and
   a first clad original layer and a second clad original layer sequentially laminated and formed on an circumferential surface of the core original layer;
   wherein chlorine is included in both the first and second clad original layers, and
   the second clad original layer has chlorine concentration higher than that of the first clad original layer within a concentration range of not less than 500 ppm and not more than 5000 ppm.

2. An optical fiber base material according to claim 1, wherein
   the second clad original layer includes chlorine of a concentration higher than the chlorine concentration of the first clad original layer by a concentration amount within a range of not less than 100 ppm and not more than 800 ppm.

3. An optical fiber comprising:
   a core portion; and
   first and second clad portions sequentially laminated and formed on the circumferential surface of the core portion;
   wherein chlorine is added in both the first and second clad portions, and
   the second clad portion has a chlorine concentration higher than that of the first clad portion within a concentration range of not less than 500 ppm and not more than 5000 ppm.

4. An optical fiber according to claim 3, wherein
   the second clad portion includes chlorine of a concentration higher than the chlorine concentration of the first clad portion by a concentration amount within a range of not less than 100 ppm and not more than 800 ppm.

5. A manufacturing method of an optical fiber base material comprising the steps of:
   a process for forming a porous glass intermediate body constructed by forming a porous first clad original layer on the circumferential surface of a porous core original layer;
   a process for then arranging and consolidating the porous glass intermediate body within an atmospheric gas including a chlorine-based gas with no fluorine compound;
   a process for making a porous optical fiber base material by forming a porous second clad original layer on the circumferential surface of a transparent glass intermediate body made by this consolidation;
   a process for then dehydrating the porous optical fiber base material at a temperature for dehydration set to maintain a porous state of the second clad original layer within the atmospheric gas having a chlorine concentration higher than that of the atmospheric gas during the consolidation of said porous glass intermediate body; and
   a process for next making the optical fiber base material formed as transparent glass by consolidating the porous optical fiber base material within the atmospheric gas having a chlorine concentration higher than that of the atmospheric gas at time of consolidation of the said porous glass intermediate body.

6. A manufacturing method of an optical fiber base material according to claim 5, wherein
   the first clad original layer of the porous glass intermediate body is consolidated within the atmospheric gas having a chlorine concentration not more than 1 mol %, and
   the second clad original layer of the porous optical fiber base material is consolidated within the atmospheric gas within a range of the chlorine concentration higher than 1 mol % and not more than 10 mol %.

* * * * *